United States Patent [19]

Pratt

[11] 4,015,256

[45] Mar. 29, 1977

[54] ELECTRONIC CONTROL UNIT FOR INTRUSION SYSTEM

[76] Inventor: Arnold T. Pratt, 1526 S. 1100 West, Woods Cross, Utah 84087

[22] Filed: Oct. 2, 1975

[21] Appl. No.: 618,977

[52] U.S. Cl. ................................ 340/409; 340/276

[51] Int. Cl.$^{2}$ ........................................ G01D 21/09

[58] Field of Search ....... 340/409, 274, 276, 258 R

[56] References Cited

UNITED STATES PATENTS

| | | | |
|---|---|---|---|
| 3,648,268 | 3/1972 | Paull | 340/409 X |
| 3,858,192 | 12/1974 | Fischer | 340/409 X |

*Primary Examiner*—John W. Caldwell
*Assistant Examiner*—William M. Wannisky
*Attorney, Agent, or Firm*—Lynn G. Foster

[57] ABSTRACT

An electronic control center comprising part of an intrusion (burglar) alarm system, the control center being hermetically encapsulated in a mass of hard plastic (in lieu of the conventional steel cabinet enclosure) for purposes of economy and, significantly, to protect the control center from tampering and attack by an intruder. The control center is very small and presents a single multi-conductor cable directed way from the control center to the remainder of the alarm system including the sensors. The multi-conductor cable leading to the control unit includes a positive supply conductor, a negative supply conductor, four input conductors, one output conductor and one output monitor conductor for monitoring the continuity, during the day time, of the foil on the windows and the trap wiring (lacing) across skylights, air conditioning ducts etc. If any of the input conductors, the output conductors or the positive supply conductor is cut, while the system is activated, an alarm will occur. If the foil monitor output conductor is cut, the foil monitor buzzer will be disabled. In addition to the specific circuitry of the control center, light emitting diodes (LEDs) are imbedded in the protective mass of plastic and connected to the circuitry to respectively indicate the current status of the system per se and various areas of the system under surveillance. This is also important in trouble-shooting and in determining whether the system is functioning correctly.

8 Claims, 7 Drawing Figures

ELECTRONIC CONTROL UNIT FOR INTRUSION SYSTEM

BACKGROUND

1. Field of Invention

The present invention relates generally to the area of electronic control centers used within intrusion (burglar) systems and more particularly to a uniquely packaged control center imbedded within a hermetic hard plastic encapsulation as a protection against tampering and attacks against the alarm system by an intruder.

2. Prior Art

It has become customary to mount the electronic circuitry of a control center of an intrusion center inside a steel enclosure or cabinet, which is physically locked to prevent unauthorized personnel from having access to the circuitry with the steel cabinet being normally equipped with a switch which causes an alarm if the cabinet or box is opened while the system is enabled.

In the beginning, electronic control panels for burglar alarm systems relied upon relay logic. Foil was placed on windows and switches on doors as well as trap wiring around skylights, air conditioning ducts and the like, all of these areas of surveillance being connected in series into a large closed circuit loop. A battery and relay coil were wired into the loop so that the relay would be normally energized, until the loop was broken somewhere by opening a door, breaking a window, etc. When broken, the relay would become deenergized causing a normally open switch to close and an alarm to sound or a telephone call to be made to the police station. A holding contact on the relay was used to hold the relay in the alarmed condition until it was subsequently reset by the owner. While this simple system (which has been and continues to be widely used) has been replaced to some extent by more sophisticated circuitry, problems have persisted. Typically, the alarm is triggered by the owner leaving the premises, unless a key switch with a delay or located outside the building is used. Inside the building, the control center must be protected from tampering by an experienced burglar, which has heretofore been attempted by hiding the control center or enclosing it within the mentioned metal cabinet or box. Troubleshooting the system and locating malfunctions and/or a specific area of surveillance which has been invaded by an intruder has been extremely difficult in complex installations. Normally, special test equipment is required. In the past, prior art alarm systems, when enabled and a door or window has been left open, will issue an alarm usually resulting in a visit from the local police. In the past on many occasions intruders will enter a business during the day when the business is open and the alarm system shut down, and with fingernails or a sharp object scratch the protective foil on the windows or sever a conductor at some other location so that the alarm system cannot be turned on without causing alarm. If the owner elects or is required to defer repair of the system until the following day, the burglar will be undetected that evening. With systems of the prior art when a false alarm occurs, the police or other personnel cannot gain access to the building and the alarm continues to sound until the batteries go dead or until someone puts a ladder against the side of the building and cuts the system's wires, permitting subsequent access to the building by burglars that evening.

BRIEF SUMMARY AND OBJECTS OF THE PRESENT INVENTION

The present invention, by way of summary, comprises an electronic control center forming part of an intrusion alarm system the control center being hermetically encapsulated in a mass of hard plastic resulting in substantial economies and protecting the control center from tampering or attack by an intruder without an auxilliary alarm. A single multiconductor cable bridges between the control center and the remainder of the alarm system such that if the cable or the individual conductors of the cable are severed an alarm will result. Novel specific control circuitry is provided which comprises utilization of solid state lamps imbedded in the protective mass of plastic and respectively indicating the current status of the system and/or various areas under surveillance by the system, which aids significantly in troubleshooting and testing the system. The system uniquely provides for delay time in evacuating the building after the alarm has been enabled, novelly triggers an alarm by turning the system "low", uniquely provides for resetting the system, is believed to be substantially tamper proof by reason of the encapsulation, provides current status reports through indicator lights as to the condition of the various areas under surveillance, a plurality of surveillance circuits, more than one of which, if desired, may be used in conjunction with the surveillance of a given area are provided so that experienced burglars may not as readily disable the alarm circuitry in respect to any single area under surveillance. The present system may also be used as an eavesdropping circuit and memory capability is provided preserving, electronically, the history of intrusions over a prior interval of time, and troubleshooting and system testing is readily accomplished by reliance upon visual indicators. No exposed terminals or testpoints will exist near the control unit. LED indicators will accomplish testpoint functions.

Two or more of the control units may be connected together in larger installations or in installations where it may be desirable to separate perimeter protection and internal protection control. When employees are working late the perimeter protection may be enabled while the internal alarm system is turned off, offering a higher degree of personal security without limiting freedom of movement.

With the foregoing in mind, it is a primary object of the present invention to provide an improved control center for an intrusion alarm system.

It is a further important object of the present invention to provide a control center for an intrusion alarm system wherein the control center circuitry is more economically manufactured and is essentially tamper proof, requiring no separate alarm for detecting of unauthorized personnel tampering with the control center.

It is a further paramount object of the present invention to provide improved troubleshotting and system testing capability by a memory system indentifying the zone or zones under surveillance into which an intruder has passed without authorization.

A further object of significance is the provision of a control center for an intrusion alarm having a single multi-conductor cable the severance of individual conductors or the cable causing an alarm.

It is a further principal object of the present invention to provide a control center for an intrusion alarm system providing an adjustable delay in enabling the alarm system to allow the owner to vacate the building, having a memory informing the owner of intrusions during a preceding interval of time in any specific area under surveillance, multiple circuits are provided for each area of surveillance to increase the likelihood of an intruder disabling the system.

It is a further important object to provide an alarm system having a novel reset provision and/or novel delay provision and/or a novel technique for causing the system to alarm by going "low."

These and other objects and features of the present invention will be apparent from the following detailed description, taken with reference to the accompanying drawings.

DETAILED DESCRIPTION OF THE IILLUSTRATED EMBODIMENT

Figure 1:
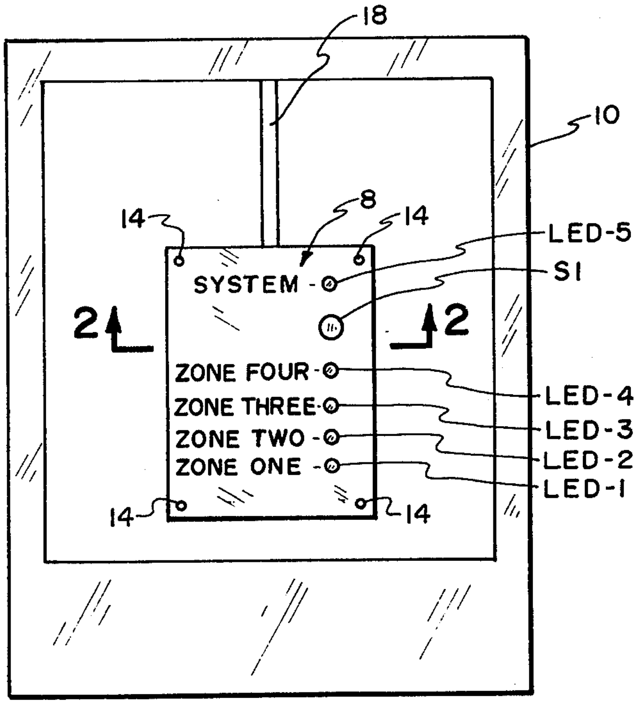
FIG. 1 is a plan view of a presently preferred control center for an intrusion alarm system in accordance with the present invention.
Figure 2:
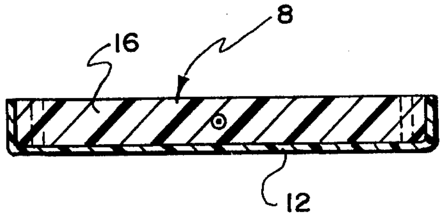
FIG. 2 is a cross-sectional view taken along lines 2—2 of FIG. 1.

Reference is now made to the drawings wherein a presently preferred alarm system, generally designated 10, having a control center, generally designated 8, according to the present invention. Before the key switch SW8 is turned on the reset button S1 must be depressed in order to prevent the sounding of an alarm. Reset button S1 is exposed at the face of the control center 8 as are system status lamp LED5, zone one surveillance lamp (delay) LED1, zone two lamp LED2, zone three lamp LED3 and motion lamp LED4, which LED's comprise part of the system's memory. This not only informs the user that an unauthorized intrusion has occurred, but where it occurred. The memory is also helpful in troubleshooting and system checking. Otherwise, the circuitry of the control center 8 is disposed within a concavity formed by a plastic skin or layer 12, having apertures 14 in the corners for receiving mounting screws or the like. The skin 12 may be of any suitable material such as vinyl. Said circuitry, hereinafter more fully explained, is imbedded within a mass of hard plastic 16 typically poured while in a liquid state into the concavity of the skin over the circuitry. This results in substantial savings in fabrication costs compared with the conventional technique which relies upon a locked metal box. Also, with the present system no tamper switch is provided for the control system as removal of plastic 16 is almost impossible and if accomplished would certainly cause the circuitry therein to be severed causing an alarm as hereinafter explained. In short, use of plastic 16 results in a control center which is less costly and far more tamper proof.

A single multi-conductor cable 18 connects the control center 8 to the remainder of the alarm system such that when the cable or any wire thereof is cut the circuit cut goes low and an alarm results.

In respect to FIGS. 3(a) – 3(e), the system 10 is preferably operated by a 12 volt source of electrical power. Pressing reset button S1 causes discharge of capacitors C1, C2, C3 and C4. The purpose of resistor R1 and capacitor C1 is a low pass filter to remove transients on the protective loop line so that the transients do not reach integrated circuit U1 and cause damage. U1 (and all other integrated circuits designated with the prefix "U") is preferably a hex buffer such as CD 4050 AE manufactured by National Semiconductor and others. The purpose of resistor R2 is to pull the input to integrated circuit U2 low when the main door (SW2) to the building is open (with the system 10 enabled). Thus, upon leaving in the evenings, reset button S1 is depressed and the system key switch SW8 thereafter turned on, S1, as mentioned, discharges the four capacitors. The time constant of capacitor C2 and resistor R3 is such that the amount of time required for charging is approximately 2 ½ minutes. This allows the owner to enable the system and leave the building afterward without sounding an alarm.

The purpose of the integrated circuit U2 is to disable the alarm system. This occurs as follows. The discharge of capacitor C2 has been described. At the point in time with the system enabled, the input to integrated circuit U2 is high. As capacitor C2 charges, which takes approximately 2 ½ minutes, the input voltage on integrated circuit U2 steadily decreases with respect to ground until integrated circuit U2 is caused to switch, meaning that the input to U2 goes low and the output low also. That enables the system in the following way. Diode CR2 limits the charge on capacitor C3 to approximately 0.6 of one volt before the 2 ½ minute timing function for capacitor C2 expires. When the output of integrated circuit U2 goes low, diode CR2 blocks communication of the low output state of integrated circuit U2 to the negative side of capacitor C3. Therefore capacitor C3 maintains its 0.6 of one volt charge. This gradually bleeds off to ground due to leakage, through R4, R5 and R6. At this point in time capacitor C4 is also discharged and the input to all of the integrated circuits U1, U3, U4 and U5 (as well as their outputs) is high. The input and output of integrated circuit U2 is low. The system is now enabled.

Figure 3A:
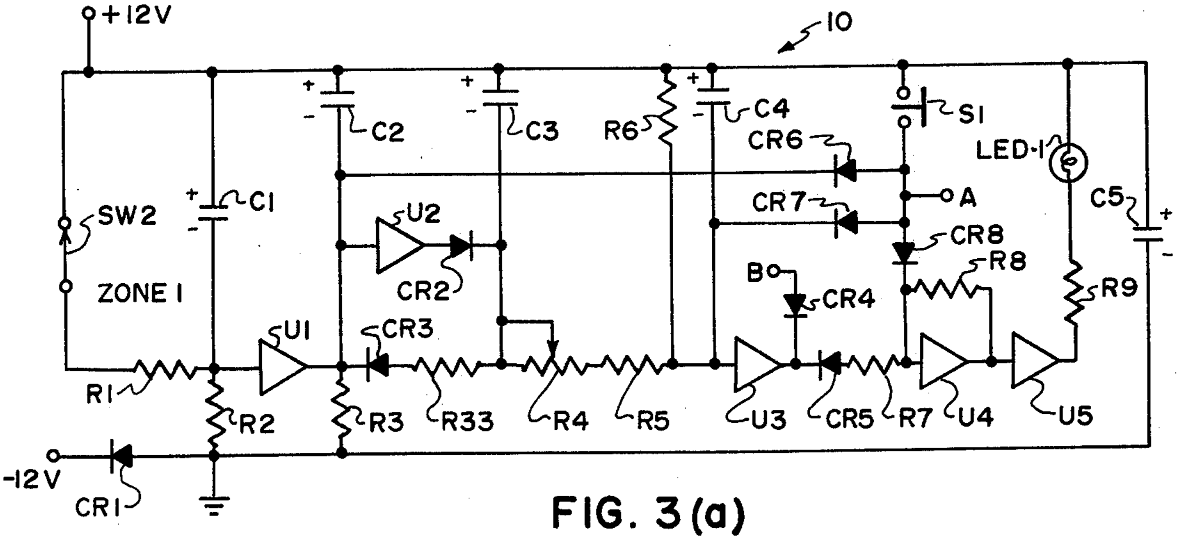
FIG. 3(a) is a circuit diagram of part of the alarm system used for surveillance of the area wherein the owner enters and leaves.

It should be noted, when the reset switch or button S1 is depressed, the positive system voltage (+12v) is communicated across S1 and diode CR8 to the input side of integrated circuit U4, which in turn causes the output thereof to go high. This condition is caused to latch by the feedback loop which comprises resistor R8, which high also is the input to integrated circuit U5 causing the output thereof also to be high. When the system 10 is thus enabled, the circuit of FIG. 3(a) being high on both sides of lamp LED1 preventing current flow and causing lamp LED1 to be off. The circuit of FIG. 3(a) is protected from voltage transients on the supply line by capacitor C5 and is protected against accidental backward installation of the circuit in connecting the circuit to the power supply by diode CR1.

Referring to FIG. 3(e), at the point in time when the system has been enabled by first depressing the reset button S1 and then turning the key switch SW8 to its NIGHT or open position, the +12 volt input voltage is communicated to one side of lamp LED5, while the closing of reset button S1 causes the high voltage to reach terminal A across S1 and diode CR8 causing integrated circuit U15 to be high at its input and output. Therefore, no current is conducted across lamp LED5 and lamp LED5 is off. At the same time, the high positive voltage at terminal A causes the base of transistor Q1 to be conductive, meaning that the collector of transistor Q1 goes low and, therefore, the OUTPUT of the system is low across resistor R30 (if key switch SW8 is in the NIGHT or open position) and an alarm is sounded. Thus, it should be clear that an intruder attempt (at night) to disable the system 10 by repeatedly pressing or continually depressing the reset button S1, will cause the high positive voltage to be communicated to terminal A whereby the system OUTPUT goes low thereby causing an alarm to issue. By the same token, if reset button S1 is depressed before the system is turned on (i.e, while key switch SW8 is in the DAY or non-alarm position) and then the key switch SW8 is placed in the alarm or NIGHT position, no alarm is issued and the previously mentioned 2 ½ minute delay time is provided whereby the owner or user of the system has time to exit the premises without issuing an alarm.

The latching circuit or feedback loop including resistor R27 is for the purpose of maintaining both the input and output of integrated circuit U15 low so that the associated lamp LED5 remains illuminated once an alarm has issued, and the output remains in an alarm condition until manually reset. Identification of the exact area under surveillance which has been invaded may also be visually ascertained, as hereinafter more fully explained.

Another advantage of the alarm latching approach is that it creates a memory light while allowing an audio or other alarm to issue only once for a predetermined period of time rather than the periodically resound as is the case if a swinger (intermittent alarm condition) exists and the system is self-resetting. A disadvantage of the alarm latching system is that only one alarm is issued, independent of the number of intrusions in a given evening, unless the system is visited and reset following an intrusion.

Referring again to FIG. 3(a) with the system 10 enabled, when the magnetic door switch SW2 is caused to be repositioned from the closed to the open condition (by an intruder), input and output of integrated circuit U1 are caused to go low by resistor R2. The capacitor C3 charges across R33 and CR3 when the door switch SW2 is open. The fact that integrated circuit U1 is then caused to be high at its output and input when the door switch SW2 is thereafter closed no longer has an effect upon the system, because the output high or integrated circuit U1 is blocked by a diode CR3. The charge on capacitor C3 is slowly transferred to capacitor C4 through potentiometer R4 and resistor R5. Potentiometer R4 controls or may be set to control the amount of time of delay following entrance prior to an alarm whereby the owner may re-enter and reach the key switch SW8, turn it to the DAY position and thereby disable the system without precipitating an alarm. Capacitor C3 is electrically much larger than capacitor C4 and therefore capacitor C4 charges at a much higher rate than capacitor C3 discharges. As capacitor C4 charges the input to integrated circuit U3 progressively lowers until it is caused to switch whereby the output of integrated circuit U3 becomes low. Terminal B is thus pulled low across diode CR4 due to the output low of integrated circuit U3. This in turn causes the input and output of integrated circuit U15 [FIG. 3(e)] to go low and electrical current is then caused to flow across lamp LED5 (indicating the system has been invaded) and resistors R28, R29 and R30 causing an alarm because the OUTPUT is low. The voltage on terminal A is low at this time as reset button S1 is open.

At the same time the input to integrated circuit U4 is caused to go low across diode CR5 and resistor R7, causing the output of integrated circuit U4 to be low, the input and output of integrated circuit U5 to be low. As a consequence, current flows across lamp LED 1 indicating with memory that zone one (containing magnetic door switch SW2) of the system has detected an intrusion. In short, lamp LED1 is the memory light for the magnetic door switch SW2 and zone one. The resistor R8 in the feedback loop of FIG. 3(a) latches integrated circuits U4 and U5 in a low output state so that lamp LED1 is caused to remain on until reset by the operator via pressing of reset button S1.

Resistor R33 isolates the output of integrated circuit U1 from the output of integrated circuit U2. Without resistor R33, in the event that the output of integrated circuit U2 is high and the output of integrated circuit U1 low, there would in effect be a short circuit across those two points. Resistor R6 has a relatively high omic value which insures that capacitor C4 correctly discharges as earlier explained. Resistor R7 insulates integrated circuit U3 from the positive high voltage delivered to terminal A across button S1 when depressed. Resistor R9 is a current limiting resistor for lamp LED1, to prevent damage to that lamp.

In regard to FIG. 3(e), resistor R25 isolates the positive high voltage, which reaches terminal A from time to time when S1 is depressed, from reaching terminal B which might cause damage to any of integrated circuits U3, U6, U9 and U12. The purpose of resistor R26 is to hold the input to integrated circuit U15 high until an alarm occurs. Resistor R28 is a current limiting resistor. Resistor R29 isolates the collector of transistor Q1 from the output of integrated circuit U15 while resistor R30 isolates the key switch SW8 from the collector of transistor Q1. Resistor R26 and capacitor C9 function to prevent communication of any transient voltages in excess of that needed to operate integrated circuit U15 to integrated circuit U15, the loop comprising resistor R27 being exposed.

Resistor R31 is a current limiting resistor for transistor Q1, while resistor R32 is to bypass any leakage current in the transistor Q1 to ground so that transistor Q1 will not inadvertently turn on.

Figure 3B:
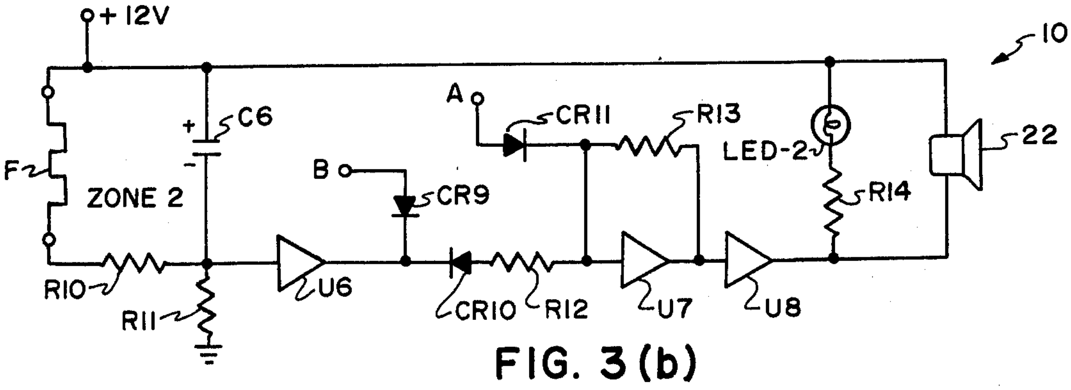
FIG. 3(b) is a diagram of another part of the circuitry used for surveillance of a second zone.
Figure 3:
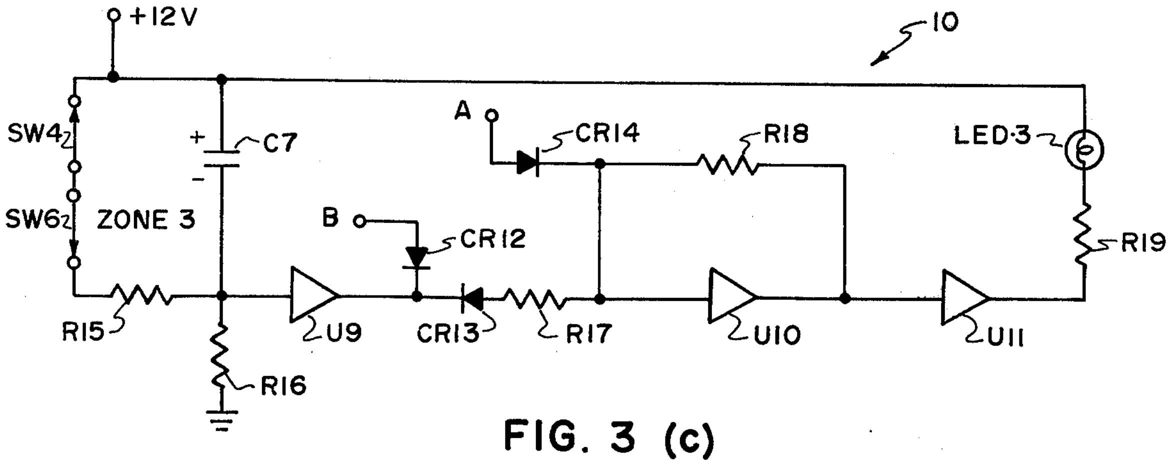
FIG. 3(c) is a diagram of additional circuitry of the alarm system used for surveillance of the third zone.
FIG. 3(d) is a diagram of additional circuitry of the alarm system used for surveillance of a fourth zone.
FIG. 3(e) is a diagram of output circuitry for the circuits of FIGS. 3(a), 3(b), 3(c), and 3(d).
Figure 3:
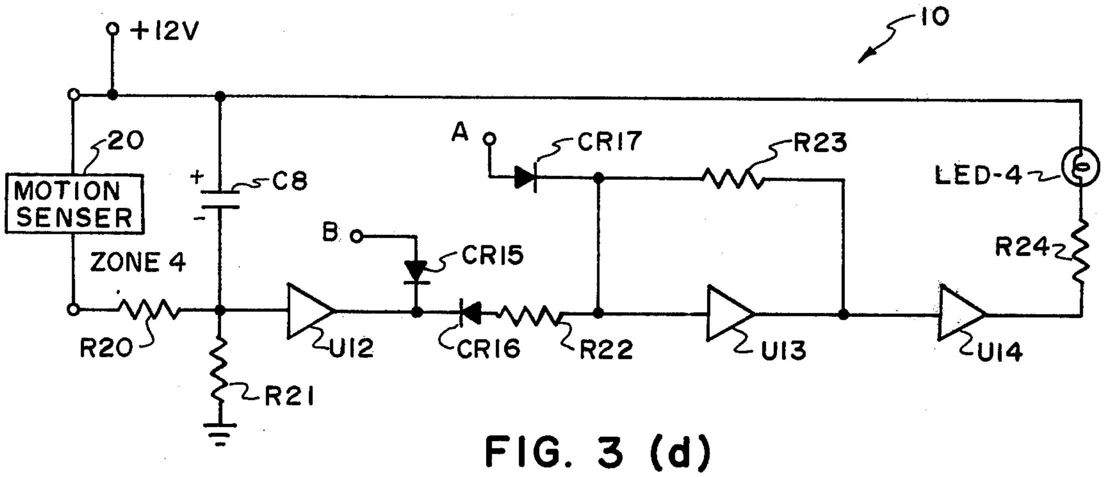
Figure 3:
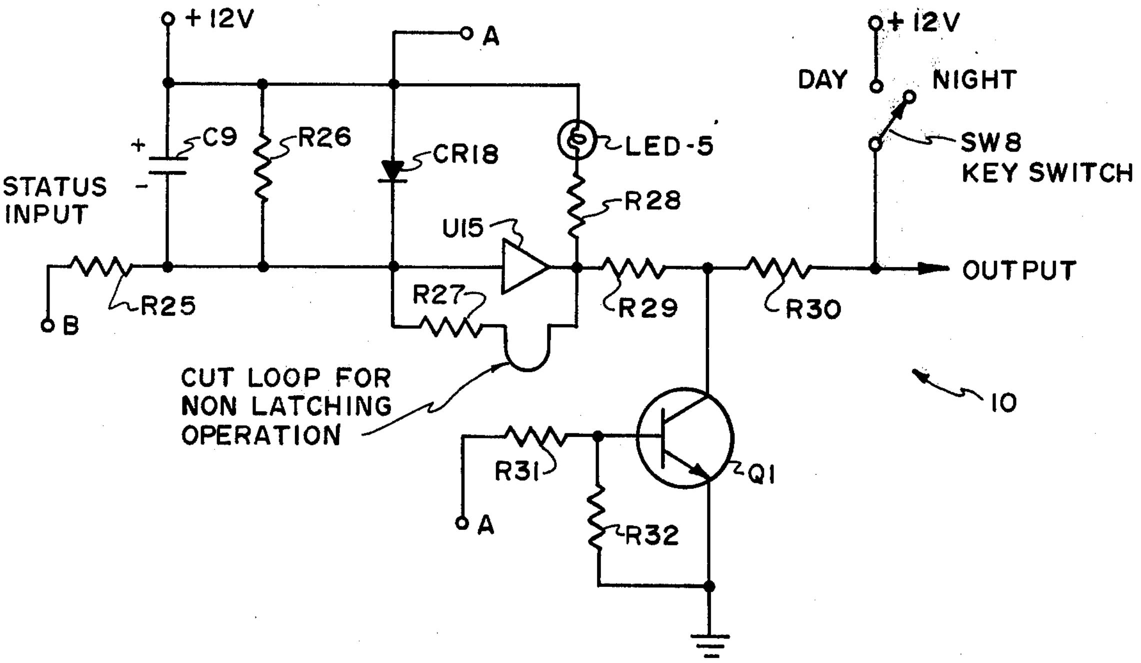

In regard to FIG. 3(b) resistor R10 and capacitor C6 form a low pass filter to prevent transient voltages from reaching integrated circuit U6. When the foil F on a window or the like is cut, resistor R11 pulls the input of integrated circuit U6 to ground or low. This causes the ouput of integrated circuit U6 to be low whereas earlier it was high due to the +12 voltage being communicated to integrated circuit U9. As a result, terminal B is pulled low across diode CR9 as is the input and output of integrated circuit U7 and the input and output of integrated circuit U8 across diode CR10 and resistor R12, resistor R13 forming part of a feedback loop holding integrated circuits U7 and U8 in their mentioned low states. Diode CR11 (across which the high positive voltage was originally communicated when S1 was depressed causing the output and inputs of integrated circuits U7 and U8 to be high) blocks communication of the low states of integrated circuits U7 and U8 to terminal A.

This low state of integrated circuits U7 and U8 causes current to flow across lamp LED2 as well as SONALERT 22 thereby illuminating lamp LED2 and causing the SONALERT 22 to alarm, which illumination is maintained by the feedback loop including resistor R13 thereby providing a "memory" for the system user informing him by visual inspection that zone two was invaded by one without authorization. It is significant that the circuit of FIG. 3(b) will cause the SONALERT to sound an alarm during the day with key switch SW8 in the DAY position so that the store manager will now immediately when and if the foil at any location in zone two has been severed. This prevents undetected severance of the foil during office or building hours and evening undetected burglarization.

Resistor R14 is a current limiting resistor for lamp LED2, while resistor R12 prevents damage to integrated circuit U6 if integrated circuit U6 should be low and button S1 is depressed.

The circuits of FIGS. 3(c) and 3(d) are virtually identical to and function in the same fashion as the previously described circuit of FIG. 3(b). For simplicity and brevity of description, the following table is presented showing the equivalence of the circuits of FIGS. 3(c) and 3(d) in comparison with the circuit of FIG. 3(b).

| Circuit of Fig. 3(b) | Circuit of Fig. 3(c) | Circuit of Fig. 3(d) |
|---|---|---|
| Foil F | Switches SW4 and SW6 | Motion Sensor 20 |
| Resistor R10 | Resistor R15 | Resistor R20 |
| Capacitor C6 | Capacitor C7 | Capacitor C8 |
| Resistor R11 | Resistor R16 | Resistor R21 |
| Integrated Circuit U6 | Integrated Circuit U9 | Integrated Circuit U12 |
| Diode CR9 | Diode CR12 | Diode CR15 |
| Diode CR10 | Diode CR13 | Diode CR16 |
| Diode CR11 | Diode CR14 | Diode CR17 |
| Resistor R12 | Resistor R17 | Resistor R22 |
| Resistor R13 | Resistor R18 | Resistor R23 |
| Resistor R14 | Resistor R19 | Resistor R24 |
| Integrated Circuit U7 | Integrated Circuit U10 | Integrated Circuit U13 |
| Integrated Circuit U8 | Integrated Circuit U11 | Integrated Circuit U14 |
| Lamp LED2 | Lamp LED3 | Lamp LED4 |

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An intrusion alarm system for surveillance of a restricted area comprising:

a source of electrical power having a positive output voltage of relatively small magnitude;

circuitry for delaying the enabling of surveillance of the restricted area which restricted area comprises an exit site, said circuitry comprising first switch means exposed, within the restricted area that actuates said delaying circuitry when manually operated and second switch means at said exit site which are open and closed by egress from said restricted area;

said delaying circuitry further comprising at least first and second logic circuits each comprising integrated circuit components, said logic circuits comprising input and output means;

the second switch means, when closed, communicating electrical power from said source to at least the input of the first logic circuit causing the input and output thereof to be high, the input and output of said first logic circuit becoming low when the switch means are opened;

RC delay circuit means comprising capacitor means connected between the source output voltage and the input to the second logic circuit and resistor means connected in series with the capacitor means between the input to the second logic circuit and ground, the RC circuit means having a time discharge constant exceeding the time for the system user to leave the restricted area via the exit sites;

circuitry means for delaying the issuance of a low output when said circuitry means are implemented by the user immediately prior to the user leaving the restricted area via the exit site which temporarily communicates the source output voltage to the input of the second logic circuit whereby the input and output of said second logic circuit are high;

means connecting the output of the first and second logic circuits to alarm means;

means blocking the communication of a low output of the first logic circuit to the alarm means;

whereby opening of the second switch means by the user leaving the restricted area via the exit site as mentioned will cause the first logic circuit to be low at its input and output which low is blocked by said blocking means and said RC delay circuit means will retain the second logic circuit in a high state for a period of time equal to the time discharge constant during which time said second switch means will again be closed, the first logic circuit becoming high at its input and output and said high being communicating to said alarm means whereby no alarm is issued.

2. An intrusion alarm system for surveillance of a restricted area comprising:

a source of electrical power having a positive output voltage of relatively small magnitude;

alarm means;

first switch means disabling and enabling the alarm means;

circuitry for delaying the issuance of an alarm by the alarm means when the first switch means is in the enabling position after a person ingresses into a restricted area through an entrance site, said circuitry comprising second switch means at said entrance site being opened and closed by a person ingressing to said restricted area;

said circuitry further comprising at least first and second logic circuits each comprising integrated circuit component, said logic comprising input and output means;

the second switch means, when closed, communicating electrical power from said source to at least the input means to the first logic circuit causing the voltage at the input means and output means thereof to be high, the voltage at the input and output means of said first logic circuit becoming low when the second switch means are opened;

resistor means interposed between the output means of the first logic circuit and the input means to the second logic circuit;

first capacitor means of relatively large charge capacity interposed between the source and the output means of the first logic circuit;

second capacitor means of relatively small charge capacity serially connected to said resistor means and first capacitor means and connected to the input means of the second logic circuit;

whereby when the voltage at the input and output means of the first logic circuit is caused to be low by opening of the second switch means the voltage at the input and output means of the second logic circuit is maintained high by a sustained discharge for a predetermined period of time of the first capacitor means to the second capacitor means during which predetermined time the person ingressing into the restricted area may actuate the first switch means to disable the alarm means without issuing an alarm.

3. An alarm system comprising:

sensor means for the surveillance of a restricted area including means for issuing an alarm when the restricted area is invaded;

a control center comprising means controlling said sensor means and said alarm means, said controlling means comprising circuitry imbedded in a mass of essentially tamper proof hard synthetic resinous material without any other physical enclosure;

said circuitry comprising delay means to allow authorized personnel to enter and exit said restricted area without issuing an alarm and a plurality of interrelated logic means interposed serially between ground and alarm output means, all of which are in a common electrical state when enabled and no invasion of the restricted area has occurred, all of the last-mentioned logic means changing state and thereby causing an alarm to issue when invasion of the restricted area occurs.

4. An alarm system according to claim 3 wherein said common electrical state is a relatively low or zero voltage level.

5. An alarm system according to claim 3 wherein the control center is electrically connected to the sensor means and the alarm means by a cable comprising a plurality of conductors respectively connected to said circuitry and the logic means thereof, the severance of the cable or said conductors causing substantially all of said logic means to change state and an alarm to issue.

6. An alarm system according to claim 3 further comprising memory means comprising a plurality of lamps responsively interconnected to said circuitry said circuitry being imbedded in said mass of essentially tamper proof hard synthetic resinous material, said lamps being substantially imbedded in said material with a portion of each exposed at the face of said material.

7. An intrusion alarm system comprising:

an alarm output circuit whereby an alarm issues when the circuit output voltage is low;

transistor means connected at the collector thereof to the alarm output and to ground at the emitter of said transistor means;

normally open reset switch means connected to an input voltage from an electrical power supply and by which said input voltage is momentarily communicated to the base of the transistor means;

key switch means connected between the input voltage and the alarm output whereby the input voltage is caused to be communicated to said output when the key switch means are closed;

whereby (a) when the reset switch means are first momentarily closed followed by opening of the key switch means, the system is enabled without issuance of an alarm by said reset switch means placing substantially all of the system logic circuitry in a high state, (b) momentary closing of the reset switch means after the system is enabled causes the output to be placed at ground potential by said closing changing the logic state from high to low causing an alarm to issue, and (c) prior to the system being enabled, operating of the key switch means followed by closing of the reset switch means will place that output at ground potential by also changing the logic state from high to low causing an alarm to issue.

8. An intrusion alarm system comprising:

input means for an electrical power supply;

first circuitry interposed between input power and ground comprising logic means the state of which changes when detecting intrusion into a first restricted area under surveillance;

second circuitry interposed between input power and ground comprising logic means the state of which changes when detecting intrusion into a second restricted area under surveillance;

alarm output means connected to the first and second circuitry causing an alarm to issue when at least one restricted area is invaded and the state of said logic thereof has been caused to change;

each said circuitry comprising memory means to which said change of state is communicated and means retaining said communicated change of state whereby the system user may subsequently be informed of the intrusion, and whereby the system may be tested by the user to insure proper function and detection;

at least some of said first and second circuitry being imbedded in a mass of hard synthetic resinous material and wherein said memory means comprise a plurality of lamp means connected to each circuitry, each circuitry being imbedded in a unitary, mass of hard synthetic resinous material, said lamps being substantially imbedded therein but retaining a portion thereof exposed at the face of said mass whereby intrusion into at least one restricted area will cause the lamp means associated therewith to be illuminated, and further comprising means causing said illumination to be maintained for subsequent visual inspection by the system user.

* * * * *